April 21, 1970 W. SCHUBERTH 3,508,010

CIRCUIT FOR SUBSCRIBER IDENTIFICATION IN TELEPHONE OR TELEPRINTER EXCHANGES

Filed Oct. 12, 1966 3 Sheets-Sheet 1

April 21, 1970 W. SCHUBERTH 3,508,010

CIRCUIT FOR SUBSCRIBER IDENTIFICATION IN TELEPHONE OR TELEPRINTER EXCHANGES

Filed Oct. 12, 1966 3 Sheets-Sheet 2

April 21, 1970 W. SCHUBERTH 3,508,010

CIRCUIT FOR SUBSCRIBER IDENTIFICATION IN TELEPHONE OR TELEPRINTER EXCHANGES

Filed Oct. 12, 1966

5 Sheets-Sheet 3

United States Patent Office 3,508,010
Patented Apr. 21, 1970

3,508,010

CIRCUIT FOR SUBSCRIBER IDENTIFICATION IN TELEPHONE OR TELEPRINTER EXCHANGES

Winfried Schuberth, Mauerbach, Austria, assignor to International Standard Corporation, New York, N.Y., a corporation of Delaware Filed Oct. 12, 1966, Ser. No. 586,092
Claims priority, application Austria, Oct. 12, 1965, A 9,191/65
Int. Cl. H04q *3/24, 3/72*
U.S. Cl. 179—18 6 Claims

ABSTRACT OF THE DISCLOSURE

A circuit is provided to produce signals identifying calling subscribers while preventing spurious signals due to leakage resistance, loop resistance variations and voltage variations. Auxiliary potentials and resistors are coupled to the circuit to assure sufficiently large potential differentials when calling subscribers make contact so that distinctions may be made over potential differences due to leakage, etc. Transistor amplifiers are used to further distinguished between true and false indications.

Figure 1:
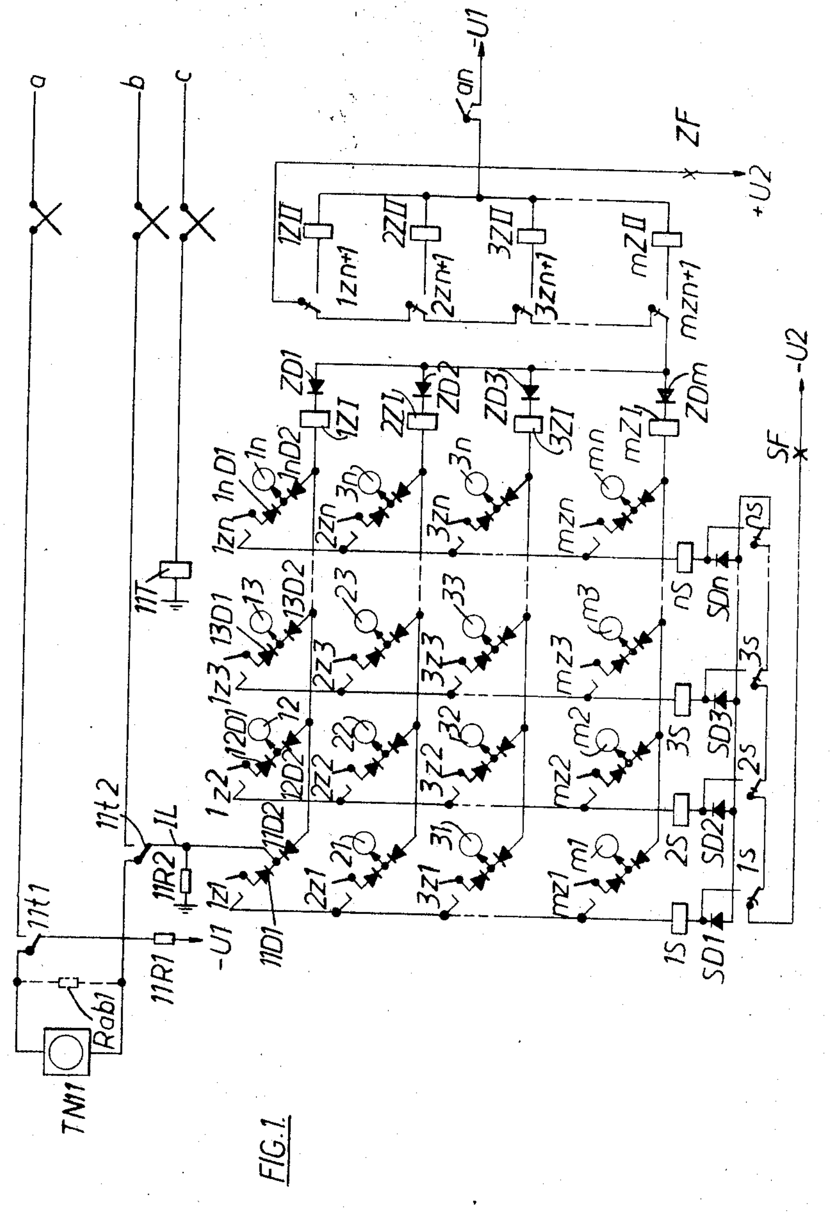

This invention relates to a circuit for identifying call-subscribers in telephone or teleprinter exchanges. In particular, it relates to identification in circuits involving cut-through elements, which constitute coupling fields in the form of cross bar switches or relay- or selector-type coupling elements or the like. The identification is initiated by a subscriber circuit.

In telephone or teleprinter exchanges, the subscriber circuit serves to influence, by means of corresponding marking and control devices (which will be referred to as markers hereinafter), the coupling field in such a manner that a subscriber who desires to establish a call and for this purpose closes an open loop is coupled to a free junction or a free register. For this purpose, the subscriber circuit must communicate to the marker the desire of the subscriber to establish an outgoing call. In a preferred circuit according to the invention, this is effected in a known manner in that each of $n$ subscriber circuits is connected by a lead (hereinafter referred to as an identifying lead) to the marker, and one of the $n$ leads, namely, that one which is associated with a calling subscriber circuit, has a potential applied to it which differs from that of the other leads.

With respect to incoming calls it is another function of a subscriber circuit to disconnect the speech wires from the starting circuit for the outgoing calls. Within the scope of the invention, this is also accomplished by known means with the aid of two change-over contacts of a relay, which is energized by a test wire.

Subscriber circuits are known, in which the above functions are accomplished with two relays or with a two-step relay.

Other known subscriber circuits comprise only a single relay and utilize the loop current in the loop which is closed in the subscriber's station as a calling signal. All these subscriber circuits have the disadvantage that a reduction of the insulation resistance between the speech wires to a certain value may result in an erroneous call signal, partiuclarly when the insulating resistance (identified $R_{ab1}$ in FIGS. 1–3) drops simultaneously in a plurality of stations. This defect may be avoided if the switching means which are responsive to the loop current are so insensitive that they will not respond to currents which are more than slightly below the normal loop current. In this case, however, severe limitations are imposed as regards the maximum loop resistance which is permissible, the maximum operating voltage fluctuations which are permissible, and the maximum number of subscribers which may be connected to a common identification relay in the marker.

It is an object of the present invention to avoid with the aid of simple means all disadvantages which have been stated hereinbefore and particularly to provide a subscriber circuit which includes only a normal relay (no two-step relay), which may be a flat relay, round relay or other relay, which circuits meet the same requirements as known subscriber circuits having two relays as to leakage resistance, loop resistance and voltage variations.

The invention is characterized in that each subscriber circuit has for each subscriber only one ordinary, flat, round or other relay and includes an additional resistor connected between ground and an identifying lead which is decoupled in known manner by two diodes associated with each subscriber. The lower potential end of each row and the lower end of each column are connected to two auxiliary voltage sources associated with the rows and columns, respectively, so that the potential of said lower potential ends is increased in amount. For an identification of a calling subscriber, current changes in the subscriber's loop relative to the known marker result in voltage changes at the additional resistor and these voltage changes are tested by means of the diodes associated with each subscriber and the auxiliary voltages and the identifying means as to whether the current flowing in the identifying leads indicates a genuine demand for a cut-through operation or only a current due to a leakage. In this way a correct identification is obtained even in the case of a high leakage between the *a*- and *b*-wire and with a large number of subscribers associated with the same row or column.

Figure 2:
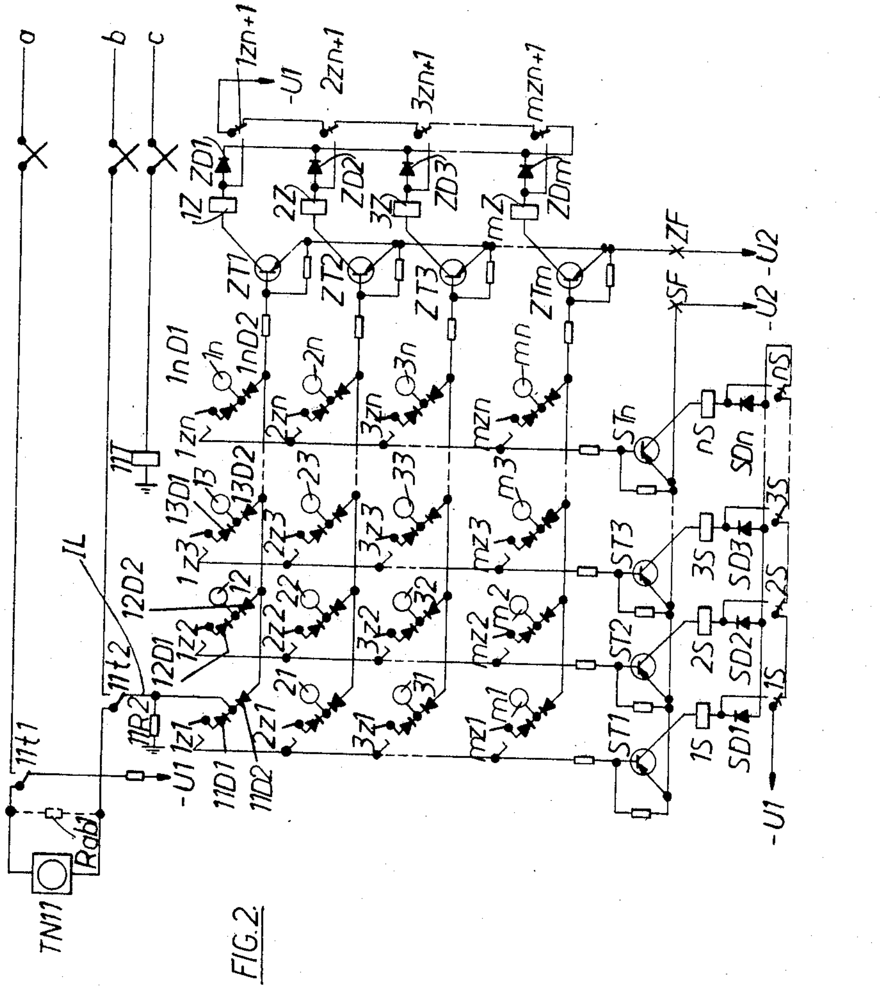
Figure 3:
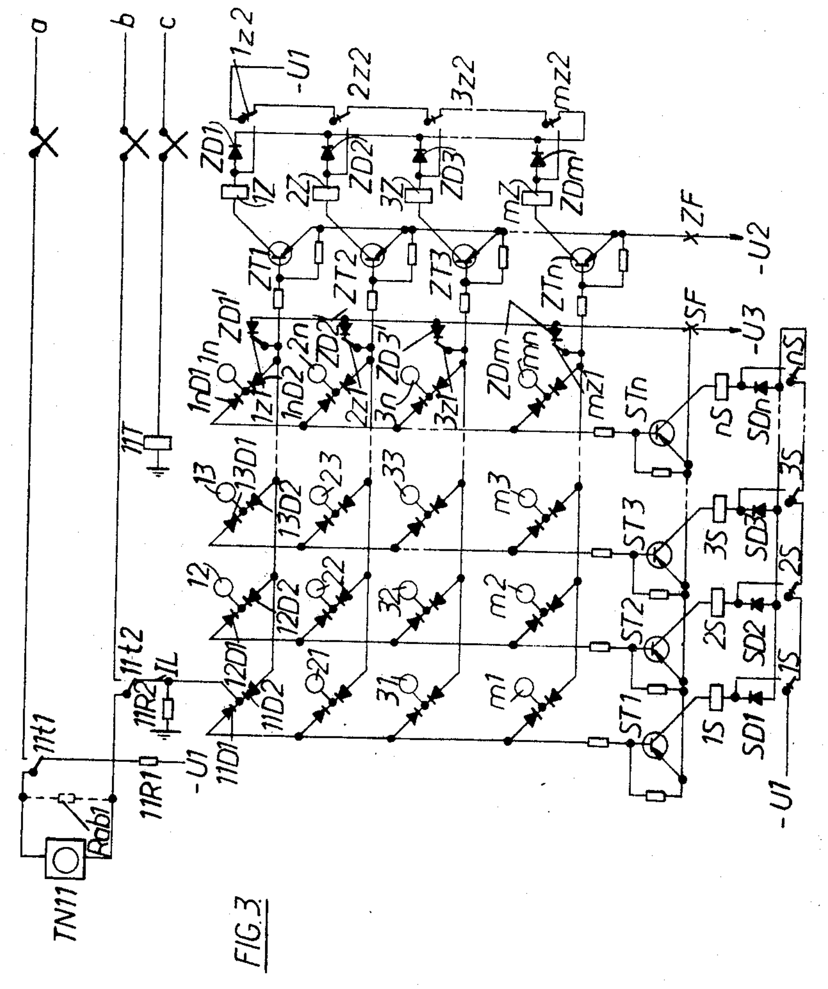

The invention will now be explained with reference to the drawings. FIG. 1 illustrates the basic concept of the invention. In FIG. 2, D.C. amplifiers are connected between the rows and the row relays and between the columns and the column relays. In FIG. 3, different auxiliary voltages are applied to the lower end of the rows and columns.

FIG. 1 shows the subscriber and its subscriber circuit and part of the marker which controls the coupling field.

The subscriber circuit, e.g., of subscriber 11, consists of relay 11T in the *c*-wire, the two change-over contacts 11*t*1 and 11*t*2, the resistors 11R1 and 11R2, and the two diodes 11D1 and 11D2 in the identifying matrix.

The numbers which are in a circle in the identifying matrix indicate the connections to the respective subscribers.

Of the circuit components shown in FIG. 1, the marker which controls the coupling field includes the row relays 1Z . . . *m*Z (having two coils each designated separately by Roman numerals I and II), which have normally open contacts 1*z*1 . . . 1*zn*, 2*z*1 . . . 2*zn*, . . . *mz*1 . . . *mzn* included in the identifying matrix, also changeover contacts 1*zn*+1 . . . *mzn*+1, and the row diodes ZD1 . . . ZD*m*, as well as the column relays 1S . . . *n*S with the changeover contacts $1s \ldots ns$, and the column diodes SD1 . . . SD*n*.

The undesirable effect of the reduction of the insulation resistance $R_{ab1}$ on the identifying relays 1Z . . . *mz*, 1S . . . *n*S, is to be shown first. For this purpose it is imagined that the resistor 11R2 is omitted and ground potential rather than the auxiliary voltage −U2 is applied to the known blocking chain consisting of the row relays 1Z . . . *m*Z or the column relays 1S . . . *n*S. When it is assumed that for any given subscriber the ratio of maximum loop resistance to minimum leak resistance $R_{ab1}=1:10$ and that the identifying matrix comprises ten columns, the first coil of the row relay 1Z is supplied by each of the ten subscriber circuits associated with it with exactly $1/10$ of the required threshold current, owing to the leakage resistance $R_{ab1}$. Thus, the row relay will certainly respond even when no subscriber has completed a loop by lifting the receiver. According to the invention, supply of such wrong information to the marker as a result of leaks is entirely prevented in that in each subscriber circuit the resistor R2 (in the subscriber circuit 11 the resistor 11R2) is connected between ground and the identifying lead, and that lower potential points SF of the row relays and ZF of the column relays are adjusted to a negative potential relative to ground with the aid of an auxiliary voltage −U2.

The resistance R2 and the auxiliary voltage −U2 must be selected so that the voltage which appears across the resistor R2 when the loop is open is more positive than the auxiliary voltage −U2. In this case the diode 11D2 as well as 12D2, 13D2 etc. are blocked and neither the row relays nor the column relays can respond. The lower limit of the resistor R2 and the upper limit of the auxiliary voltage −U2 are determined by the requirement that in the case of maximum loop resistance and minimum battery voltage −U1 the row relays 1Z . . . *m*Z and the column relays 1S . . . *n*S must reliably respond to the formation of a loop.

This arrangement enables a definite identification of a subscriber independently of the ratio of the loop resistance to the leakage resistance.

FIG. 2 shows a circuit revealing another development of the invention. It differs from FIG. 1 by the provision of D.C. amplifiers between the rows and the row relays and between the columns and the column relays. Owing to this arrangement, the identification inputs 11 . . . 1*n*, 21 . . . 2*n*, . . *mn* have a much higher resistance so that the ratio of loop resistance to leakage resistance may be further decreased. Owing to the use of the D.C. amplifiers, the holding coils of the row relays may be omitted.

Another embodiment of the invention is shown in FIG. 3. In FIGS. 1 and 2, a wrong identification which might be caused by a simultaneous lifting of the receiver in two subscribers, which are spaced in the direction of a diagonal in the matrix, such as subscribers 12 and 21 or 13 and 31, is prevented in known manner by the provision of contacts 1*z*1, 1*z*2 . . . 1*zn* or 2*z*1, 2*z*2 . . . 2*zn* etc. In FIG. 3, an auxiliary voltage −U3 (U3, U2) is applied to the rows by contacts 1*z*1, 2*z*1 . . . *mz*1 of row relays 1Z, 2Z . . . *m*Z and diodes ZD1′, ZD2′ . . . ZD*m*′ so that the lifting of the receiver by one or more subscribers has initially only the effect of driving the row transistors ZT1 . . . ZT*m* from the blocked state to the conducting state so that the row relay 1Z, 2Z . . . or *m*Z which is first in the blocking chain can respond and can disconnect all subsequent row relays. The column transistors ST1 . . . ST*n* remain blocked because the base and emitter are substantially at the same potential −U3. A cut-through operation by the column transistors ST1 . . . ST*n* and a response of the first relay in the column blocking chain is not possible until the normally closed contact of the row relay of the identified row has been opened and such operations can only be caused by identifying leads which are associated with the previously identified row.

This enables an elimination of 90% of all contacts of row relays.

While the principles of the invention have been described above in connection with specific apparatus and applications, it is to be understood that this description is made only by way of example and not as a limitation on the scope of the invention.

I claim:

1. A circuit for identifying calling subscribers in a communications exchange, comprising
 a plurality of control elements including one relay for each subscriber,
 an identification matrix including row leads and column leads,
 an identifying lead from each subscriber,
 a resistor connected between ground and the corresponding identifying lead of each subscriber,
 means including two diodes for coupling each identifying lead to the identification matrix,
 one end of each row lead and each column lead of the matrix being coupled to receive a lower potential than corresponding means at the other end of the respective row lead and column lead,
 means coupling the lower potential end of each row of the matrix and the lower potential end of each column of the matrix to two auxiliary voltage sources associated with the rows and columns, respectively, to increase the potential of said lower potential ends,
 each resistor being responsive to current changes in a subscriber's identifying lead to provide a change in potential drop across said resistor, and
 said change in potential drop being tested by means of the diodes to provide a signal when the potential drop exceeds a preselected value corresponding to the drop caused by a genuine demand for a connection as distinguished from a smaller potential drop indicating current leakage.

2. A circuit substantially as claimed in claim 1, in which
 the identifying means includes row relays and column relays coupled respectively to row leads and to column leads.

3. A circuit substantially as claimed in claim 2, in which
 the identifying means includes transistors serving as D.C. amplifiers coupled between row leads and row relays as well as between respective column leads and column relays,
 whereby very low current ratios of loop resistance to leakage resistance can be detected and utilized.

4. A circuit substantially as claimed in claim 1, in which
 the auxiliary voltage source coupled to the lower potential end of each row is identical to the auxiliary voltage source coupled to the lower potential end of each column.

5. A circuit according to claim 3, in which
 contacts of the row relays are coupled to form a part of the identifying matrix,
 means are provided for connecting each of said contacts in series with a diode between connections of the rows and connections to the lower end of the columns and the auxiliary voltage of the columns, and
 the auxiliary voltage applied to the lower potential end of each row is positive relative to the auxiliary voltage applied to the lower potential end of each column so that operation of a row relay in response to a potential drop will open the related contact, thereby removing the auxiliary voltage of the column and preparing a column relay for operation.

6. A circuit substantially as claimed in claim 3, in which
 contacts of the column relays included in the identifying matrix are supplemented by a connection of the columns to the lower potential end of the rows by a contact of each column relay and a diode for each column, and the auxiliary voltage applied to the lower potential of each row is negative relative to the auxiliary voltage applied to the lower potential end of each column so that the row and column may be distinguished.

References Cited

UNITED STATES PATENTS

| | | |
|---|---|---|
| 2,999,132 | 9/1961 | Benmussa et al. |
| 3,016,425 | 1/1962 | Schwenzfeger. |
| 3,393,274 | 7/1968 | Ingraham. |

WILLIAM C. COOPER, Primary Examiner